United States Patent
Ren et al.

(10) Patent No.: US 12,238,031 B2
(45) Date of Patent: *Feb. 25, 2025

(54) METHOD FOR TRANSMITTING AND RECEIVING SIDELINK POSITIONING REFERENCE SIGNAL AND TERMINAL

(71) Applicant: DATANG MOBILE COMMUNICATIONS EQUIPMENT CO., LTD., Beijing (CN)

(72) Inventors: Xiaotao Ren, Beijing (CN); Rui Zhao, Beijing (CN); Deshan Miao, Beijing (CN); Bin Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 277 days.

This patent is subject to a terminal disclaimer.

(21) Appl. No.: 17/786,222

(22) PCT Filed: Dec. 7, 2020

(86) PCT No.: PCT/CN2020/134192
§ 371 (c)(1),
(2) Date: Jun. 16, 2022

(87) PCT Pub. No.: WO2021/121058
PCT Pub. Date: Jun. 24, 2021

(65) Prior Publication Data
US 2023/0048608 A1 Feb. 16, 2023

(30) Foreign Application Priority Data
Dec. 17, 2019 (CN) .......................... 201911302240.6

(51) Int. Cl.
H04W 72/54 (2023.01)
H04L 5/00 (2006.01)
H04W 72/542 (2023.01)

(52) U.S. Cl.
CPC .......... *H04L 5/0051* (2013.01); *H04L 5/0007* (2013.01); *H04W 72/542* (2023.01)

(58) Field of Classification Search
CPC ........................ H04L 5/0051; H04W 72/542
(Continued)

(56) References Cited

U.S. PATENT DOCUMENTS 11,013,010 B2 * 5/2021 Rico Alvarino ...... H04W 72/51
11,695,525 B2    7/2023 Da et al.
(Continued)

FOREIGN PATENT DOCUMENTS

CN    101931857 A    12/2010
CN    101931862 A    12/2010
(Continued)

OTHER PUBLICATIONS

Written Opinion and International Search Report for International Patent Application No. PCT/CN2020/134192 dated Mar. 8, 2021.
(Continued)

*Primary Examiner* — Sibte H Bukhari
(74) *Attorney, Agent, or Firm* — Harness, Dickey & Pierce, P.L.C.

(57) ABSTRACT

The present disclosure provides a method for transmitting and receiving a sidelink positioning reference signal and a terminal. The method includes: when a resource occupied by the sidelink positioning reference signal collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block, an automatic gain control information and a guard period information.

12 Claims, 8 Drawing Sheets

(58) Field of Classification Search
USPC .......................................................... 370/330
See application file for complete search history.

(56) References Cited

U.S. PATENT DOCUMENTS

| | | |
|---|---|---|
| 2007/0170566 A1 | 7/2007 | Kurosawa |
| 2011/0081917 A1 | 4/2011 | Frank et al. |
| 2012/0027110 A1 | 2/2012 | Han et al. |
| 2012/0094691 A1 | 4/2012 | Chen et al. |
| 2013/0267246 A1 | 10/2013 | Wang et al. |
| 2016/0095092 A1 | 3/2016 | Khoryaev et al. |
| 2017/0142682 A1 | 5/2017 | Gunnarsson et al. |
| 2017/0289831 A1 | 10/2017 | Park et al. |
| 2018/0048444 A1 | 2/2018 | Park et al. |
| 2018/0092314 A1 | 4/2018 | McGuinness et al. |
| 2018/0098314 A1* | 4/2018 | Rico Alvarino ...... H04W 72/23 |
| 2018/0331799 A1 | 11/2018 | Zhang et al. |
| 2019/0230618 A1 | 7/2019 | Saur et al. |
| 2019/0239181 A1 | 8/2019 | Gangakhedkar et al. |
| 2020/0408871 A1 | 12/2020 | Da et al. |
| 2021/0112522 A1 | 4/2021 | Kim et al. |
| 2022/0014325 A1 | 1/2022 | Zhao |
| 2022/0385423 A1 | 12/2022 | Ko et al. |

FOREIGN PATENT DOCUMENTS

| | | |
|---|---|---|
| CN | 102422663 A | 4/2012 |
| CN | 102595450 A | 7/2012 |
| CN | 104010363 A | 8/2014 |
| CN | 106656446 A | 5/2017 |
| CN | 106664518 A | 5/2017 |
| CN | 107852582 A | 3/2018 |
| CN | 109327901 A | 2/2019 |
| CN | 109644458 A | 4/2019 |
| CN | 110383862 A | 10/2019 |
| CN | 110536234 A | 12/2019 |
| CN | 110545533 A | 12/2019 |
| EP | 3742829 A1 | 11/2020 |
| EP | 4054102 A1 | 9/2022 |
| WO | WO-2012094973 A1 | 7/2012 |
| WO | WO-2013139041 A1 | 9/2013 |
| WO | WO-2014131349 A1 | 9/2014 |
| WO | WO-2018028941 A1 | 2/2018 |
| WO | WO-2018178751 A1 | 10/2018 |
| WO | WO-2019/141090 A1 | 7/2019 |

OTHER PUBLICATIONS

Chinese Office Action for CN Application No. 201911302240.6 dated Nov. 2, 2021.
Huawei, Hisilicon, "Dl Rs design for NR positioning", Agenda Item 7.2.10.1, 3GPP TSG RAN Wg1 #97, R1-1906052, May 13-17, 2019, Reno, USA.
Huawei, DL and UL Reference Signals for NR Positioning, Agenda 7.2.10.1, 3GPP TSG RAN WG1 Meeting #96bis, R1-1904004, Apr. 8-12, 2019, Xi'an, China.
Extended European Search Report issued Dec. 12, 2022 in European Application No. 20901648.4.
Intel Corporation, "Feature Lead Summary #2 on AI 7.2.10.1-DL Reference Signals for NR Positioning," 3GPP Draft; R1-1913473, vol. RAN WG1, Nov. 25, 2019.
Extended European Search Report for corresponding European Patent Application No. 20904335.5 issued on Feb. 6, 2023.
International Search Report for PCT/CN2020/120873 issued on Dec. 30, 2020 and its English translation provided by WIPO.
Written Opinion for PCT/CN2020/120873 issued on Dec. 30, 2020, and its English translation provided by WIPO.
International Preliminary Report for PCT/CN2020/120873 issued on Jun. 28, 2022 and its English translation provided by WIPO.
First Office Action and search report for Chinese Patent Application 201911365078.2 issued on Nov. 26, 2021 and its English Translation provided by the Chinese Patent Office.
Office Action issued Aug. 1, 2024 in U.S. Appl. No. 17/789,152.

* cited by examiner

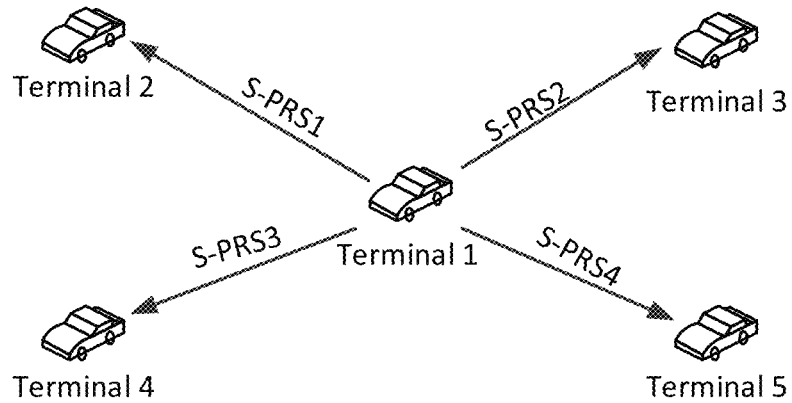

FIG. 1

When a resource occupied by the sidelink positioning reference signal collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), automatic gain control information and guard period information

When a resource occupied by the sidelink positioning reference signal collides with a resource occupied by at least one type of information in a first information set, not receiving the S-PRS on the collided resource, wherein the first information set includes: at least one of a sidelink physical channel, a sidelink reference signal, a sidelink synchronization signal, a sidelink synchronization signal block, automatic gain control information and guard period information    71

FIG. 7

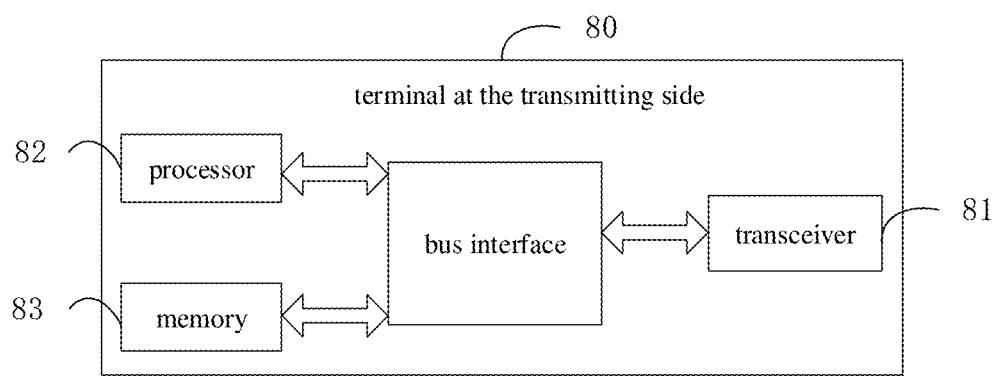

FIG. 8

METHOD FOR TRANSMITTING AND RECEIVING SIDELINK POSITIONING REFERENCE SIGNAL AND TERMINAL

CROSS-REFERENCE TO RELATED APPLICATIONS

This application is the U.S. national phase of PCT Application No. PCT/CN2020/134192 filed on Dec. 7, 2020, which claims priorities of the Chinese patent application No. 201911302240.6 filed on Dec. 17, 2019, which are incorporated herein by reference in their entireties.

TECHNICAL FIELD

The present disclosure relates to the field of communications technology, in particular to a method for transmitting and receiving a sidelink positioning reference signal and a terminal.

BACKGROUND

In order to be able to support the driverless function, the New Radio (NR) vehicle-to-everything (V2X) system also needs to be positioned to obtain the relative position between the two vehicles. In order to complete the relative positioning between vehicles, it is necessary for the terminal vehicle to transmit a Sidelink Positioning Reference Signal (S-PRS) on a Sidelink port, and then other terminal vehicles nearby can implement the measurement and calculation based on the S-PRS to get the relative position between the vehicles. As shown in FIG. 1, terminal 1 transmits multiple S-PRSs, and other terminals around terminal 1, such as terminal 2 to terminal 5, can obtain the relative position with terminal 1 according to the S-PRSs transmitted by terminal 1. When transmitting the S-PRS for positioning, terminal 1 also needs to transmit other channels or signals to complete the communication function of the sidelink. Then, these other channels and signals and the S-PRS may located on the same resource element (RE), the same symbol or the same resource block (RB), the S-PRS will cause interference with other channels or signals. When such interference or collision is very severe, the positioning performance or communication efficiency will be severely degraded.

SUMMARY

Embodiments of the present disclosure provide a method and a terminal for transmitting and receiving a sidelink positioning reference signal. It can enable the terminal transmit the S-PRS to complete the positioning function, while reducing the mutual interference between the S-PRS and other sidelink physical channels, sidelink reference signals, sidelink synchronization signals, AGC or GP, and improving the positioning accuracy and spectral efficiency of the sidelink.

In order to solve the above-mentioned technical problems, the embodiments of the present disclosure provide the following technical solutions.

a method for transmitting a sidelink positioning reference signal is applied to a terminal, and includes: when a resource occupied by the sidelink positioning reference signal (S-PRS) collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information.

Optionally, the resource occupied by the S-PRS colliding with the resource occupied by at least one type of information in the first information set includes: the S-PRS and the at least one type of information in the first information set occupying at least one same resource element; or, the S-PRS and the at least one type of information in the first information set occupying at least one same Orthogonal Frequency Division Multiplexing (OFDM) symbol.

Optionally, the same resource element refers to that two occupied resource elements are located in the same OFDM symbol and a same subcarrier.

Optionally, the resource includes: at least one of a resource element (RE), an OFDM symbol, a slot, or a resource block (RB).

Optionally, not transmitting the S-PRS on the collided resource includes at least one of the following: not transmitting the S-PRS on the RE occupied by the at least one type of information in the first information set; not transmitting the S-PRS on the OFDM symbol or the slot occupied by the at least one type of information in the first information set; not transmitting the S-PRS on the RB occupied by the at least one type of information in the first information set.

Optionally, not transmitting the S-PRS on the collided resource includes: determining whether to transmit the S-PRS on the collided resource in a pre-configured mode or through a configuration signaling, and determining not to transmit the S-PRS on at least one of collided REs, symbols, slots, or RBs.

Optionally, not transmitting the S-PRS on the symbol or the slot occupied by at least one type of information in the first information set, incudes: for a neighboring transmission reception point (TRP) or a neighboring cell, after determining a first time-frequency location on which the at least one type of information in the first information set of the neighboring TPR or neighboring cell is transmitted, not transmitting the S-PRS on a symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resource occupied by the S-PRS collides with a resource occupied by at least one physical channel of the PSCCH, the PSFCH and the PSBCH, the S-PRS is not transmitted on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with a resource occupied by at least one of the SL DMRS, the SL CSI-RS and the SL PT-RS, the S-PRS is not transmitted on the collided resource.

Optionally, the sidelink synchronization signal includes: at least one of S-PSS or S-SSS; when the resource occupied by the S-PRS collides with a resource occupied by at least one of the S-PSS or the S-SSS, the S-PRS is not transmitted on the resource that collide with the resource occupied by at least one of the S-PSS or the S-SSS among resources for transmitting the S-PRS.

Optionally, the method further includes: transmitting the S-PRS on remaining resources other than the collided resource among the resources occupied by the S-PRS.

Optionally, when transmitting the S-PRS on remaining resources other than the collided resource among the resources occupied by the S-PRS, the method further includes: when the transmitted S-PRS is located in a first symbol, the S-PRS occupying at least part of frequency domain resources in the first symbol for transmission; or, S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or, an S-PRS pattern on the first symbol in one slot being exactly the same as a PRS pattern on a second symbol, the first symbol being used as automatic gain control.

A method for receiving a sidelink positioning reference signal is applied to a terminal and includes: when a resource occupied by the sidelink positioning reference signal (S-PRS) collides with a resource occupied by at least one type of information in a first information set, not receiving the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information.

Optionally, the resource occupied by the S-PRS colliding with the resource occupied by at least one type of information in the first information set includes: the S-PRS and the at least one type of information in the first information set occupying at least one same resource element; or, the S-PRS and the at least one type of information in the first information set occupying at least one same Orthogonal Frequency Division Multiplexing (OFDM) symbol.

Optionally, the same resource element refers to that two occupied resource elements are located in the same OFDM symbol and a same subcarrier.

Optionally, the resource includes: at least one of a resource element (RE), an OFDM symbol, a slot, or a resource block (RB).

Optionally, not receiving the S-PRS on the collided resource includes at least one of the following: not transmitting the S-PRS on the RE occupied by the at least one type of information in the first information set; not transmitting the S-PRS on the OFDM symbol or the slot occupied by the at least one type of information in the first information set; not transmitting the S-PRS on the RB occupied by the at least one type of information in the first information set.

Optionally, not receiving the S-PRS on the collided resource includes: determining whether to receive the S-PRS on the collided resource in a pre-configured mode or through a configuration signaling, and determining not to receive the S-PRS on at least one of collided REs, symbols, slots, or RBs.

Optionally, not transmitting the S-PRS on the symbol or the slot occupied by at least one type of information in the first information set, incudes: for a neighboring transmission reception point (TRP) or a neighboring cell, after determining a first time-frequency location on which the at least one type of information in the first information set of the neighboring TPR or neighboring cell is transmitted, not transmitting the S-PRS on a symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resource occupied by the S-PRS collides with a resource occupied by at least one physical channel of the PSCCH, the PSFCH and the PSBCH, the S-PRS is not received on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with a resource occupied by at least one of the SL DMRS, the SL CSI-RS and the SL PT-RS, the S-PRS is not received on the collided resource.

Optionally, the sidelink synchronization signal includes: at least one of S-PSS or S-SSS; when the resource occupied by the S-PRS collides with a resource occupied by at least one of the S-PSS or the S-SSS, the S-PRS is not received on the resource that collide with the resource occupied by at least one of the S-PSS or the S-SSS among resources for transmitting the S-PRS.

Optionally, the method further includes: receiving the S-PRS on remaining resources other than the collided resource among the resources occupied by the S-PRS.

Optionally, when receiving the S-PRS on remaining resources other than the collided resource among the resources occupied by the S-PRS, the method further includes: when the received S-PRS is located in a first symbol, the S-PRS occupying at least part of frequency domain resources in the first symbol for transmission; or, S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or, an S-PRS pattern on the first symbol in one slot being exactly the same as a PRS pattern on a second symbol, the first symbol being used as automatic gain control.

A terminal, includes: a transceiver, a processor, and a memory, wherein the memory stores a program executable by the processor to implement the step of: when a resource occupied by the sidelink positioning reference signal (S-PRS) collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information.

Optionally, the resource occupied by the S-PRS colliding with the resource occupied by at least one type of information in the first information set includes: the S-PRS and the at least one type of information in the first information set occupying at least one same resource element; or, the S-PRS and the at least one type of information in the first information set occupying at least one same Orthogonal Frequency Division Multiplexing (OFDM) symbol.

Optionally, the resource includes: at least one of a resource element (RE), an OFDM symbol, a slot, or a resource block (RB).

Optionally, not transmitting the S-PRS on the collided resource includes at least one of the following: not transmitting the S-PRS on the RE occupied by the at least one type of information in the first information set; not transmitting the S-PRS on the OFDM symbol or the slot occupied by the at least one type of information in the first information set; not transmitting the S-PRS on the RB occupied by the at least one type of information in the first information set.

Optionally, not transmitting the S-PRS on the collided resource includes: determining whether to transmit the S-PRS on the collided resource in a pre-configured mode or through a configuration signaling, and determining not to transmit the S-PRS on at least one of collided REs, symbols, slots, or RBs.

A device for transmitting a sidelink positioning reference signal includes: a transceiver module, configured to, when a resource occupied by the sidelink positioning reference signal (S-PRS) collides with a resource occupied by at least one type of information in a first information set, not transmit the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information.

A terminal includes: a transceiver, a processor, and a memory, wherein the memory stores a program executable by the processor to implement the step of: when a resource occupied by the sidelink positioning reference signal (S-PRS) collides with a resource occupied by at least one type of information in a first information set, not receiving the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information.

Optionally, the resource occupied by the S-PRS colliding with the resource occupied by at least one type of information in the first information set includes: the S-PRS and the at least one type of information in the first information set occupying at least one same resource element; or, the S-PRS and the at least one type of information in the first information set occupying at least one same Orthogonal Frequency Division Multiplexing (OFDM) symbol.

Optionally, the resource includes: at least one of a resource element (RE), an OFDM symbol, a slot, or a resource block (RB).

Optionally, not receiving the S-PRS on the collided resource includes at least one of the following: not transmitting the S-PRS on the RE occupied by the at least one type of information in the first information set; not transmitting the S-PRS on the OFDM symbol or the slot occupied by the at least one type of information in the first information set; not transmitting the S-PRS on the RB occupied by the at least one type of information in the first information set.

Optionally, not transmitting the S-PRS on the symbol or the slot occupied by at least one type of information in the first information set, incudes: for a neighboring transmission reception point (TRP) or a neighboring cell, after determining a first time-frequency location on which the at least one type of information in the first information set of the neighboring TPR or neighboring cell is transmitted, not transmitting the S-PRS on a symbol or slot occupied by the first time-frequency location.

A device for receiving a sidelink positioning reference signal includes: a transceiver module, configured to, when a resource occupied by the sidelink positioning reference signal (S-PRS) collides with a resource occupied by at least one type of information in a first information set, not receive the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information.

A processor-readable storage medium for storing instructions executable by a processor, so as to execute the method.

The embodiments of the present disclosure has the following effect.

In the embodiments of the present disclosure, when a resource occupied by the sidelink positioning reference signal (S-PRS) collides with a resource occupied by at least one type of information in a first information set, the S-PRS is not transmitted on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information. It can enable the terminal transmit the S-PRS to complete the positioning function, while reducing the mutual interference between the S-PRS and other sidelink physical channels, sidelink reference signals, sidelink synchronization signals, AGC or GP, and improving the positioning accuracy and spectral efficiency of the sidelink.

BRIEF DESCRIPTION OF THE DRAWINGS

FIG. 1 is a schematic diagram of a terminal vehicle transmitting S-PRS on the sidelink port;

FIG. 2 is a schematic flowchart of a method for transmitting a sidelink positioning reference signal according to an embodiment of the present disclosure;

FIG. 7 is a schematic flowchart of a method for receiving a sidelink positioning reference signal according to an embodiment of the present disclosure;

FIG. 8 is a schematic structural diagram of a terminal on the transmitting side according to an embodiment of the present disclosure;

DETAILED DESCRIPTION

Figure 3:
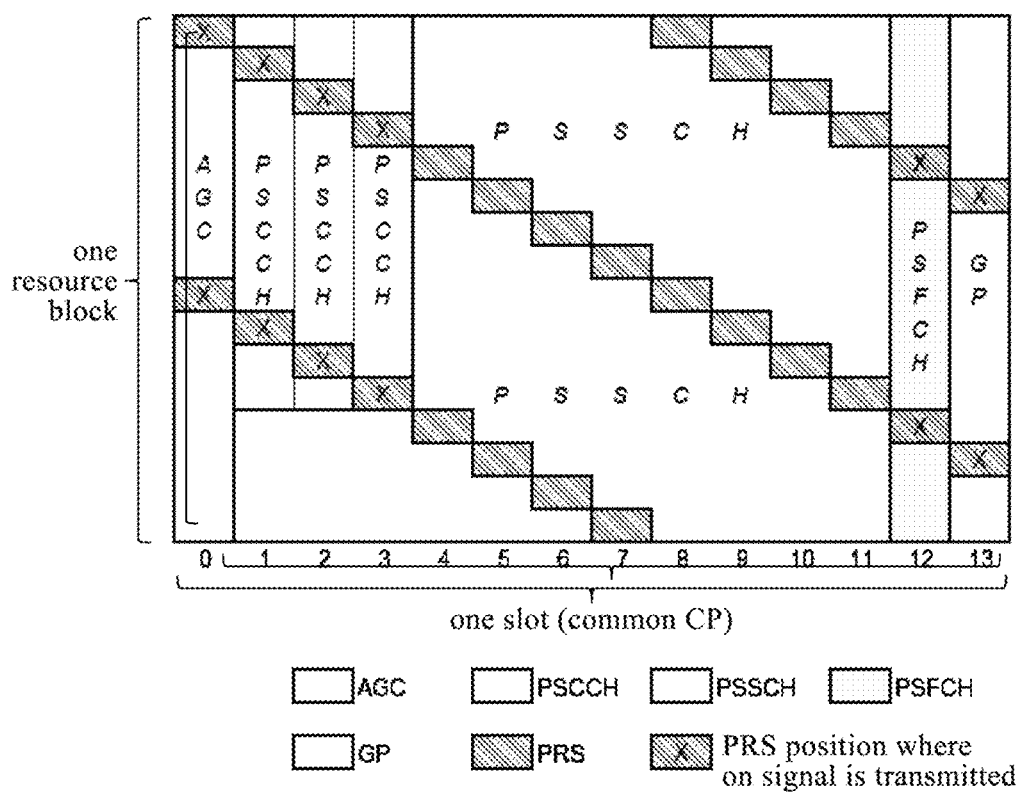
FIG. 3 is a schematic diagram of not transmitting S-PRS (puncturing) in a resource element on an AGC/PSCCH/PSFCH/GP symbol according to an embodiment of the present disclosure.

The technical solutions in the embodiments of the present disclosure will be clearly and completely described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative work shall fall within the protection scope of the present disclosure.

Exemplary embodiments of the present disclosure will be described in more detail below with reference to the accompanying drawings. While exemplary embodiments of the present disclosure are shown in the drawings, it should be understood that the present disclosure may be embodied in various forms and should not be limited by these embodiments. Rather, these embodiments are provided so that the present disclosure will be more thoroughly understood, and will fully convey the scope of the present disclosure to those skilled in the art.

In the fifth generation (5th generation, 5G) NR V2X system, the PC5 port (Sidelink) is used for direct communication between terminals. Before the service data is transmitted, the synchronization between the two terminals that need to communicate is established on the PC5 port (Sidelink). The synchronization signal of the NR V2X system is carried by the Sidelink Synchronization Signal Block (S-SSB). Each slot carries one S-SSB block, and the S-SSB is composed of the Sidelink Primary Synchronization Signal (S-PSS), the Sidelink Secondary Synchronization Signal (S-SSS) and the Physical Sidelink Broadcast Channel (PSBCH). The method of establishing synchronization is that one terminal A transmits the S-SSB, and the other terminal B receives the S-SSB transmitted by terminal A. Once terminal B receives and demodulates successfully, the two terminals can establish synchronization to prepare for the next direct communication.

During the communication process, the terminal in the NR V2X system will transmit a variety of service channels and signals to complete the direct communication process between vehicles, such as Physical Sidelink Control Channel (PSCCH), Physical Sidelink Control Channel (PSCCH), Physical Sidelink Shared Channel (PSSCH), Physical Sidelink Feedback Channel (PSFCH), and various through-link reference signals "Sidelink Demodulation Reference Signal (SL DMRS)), Sidelink Channel State Information Reference Signal (SL CSI-RS), Sidelink Phase-Tracking Reference Signal (SL PT-RS)", etc.

In addition, in the slots of sidelink, the first symbol of each slot is used for automatic gain control (AGC) to adjust the power amplifier and adapt to the rapid changes in the received signal strength. The last symbol of the slot is used as a Guard Period (GP), which is used to reserve time for transitions between transmitting and receiving or to overcome inter-symbol interference caused by timing deviations.

As shown in FIG. 2, an embodiment of the present disclosure provides a method for transmitting a sidelink positioning reference signal, which is applied to a terminal, and the method includes:

Step 21: When a resource occupied by the sidelink positioning reference signal (S-PRS) collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), an automatic gain control information (AGC) and a guard period information (GP).

This embodiment can enable the terminal to transmit the positioning reference signal S-PRS to complete the positioning function, and reduce the mutual interference between the S-PRS and other information such as the sidelink physical channel, the sidelink reference signal, the sidelink synchronization signal, the AGC or GP, so as to improve the positioning accuracy and spectral efficiency of the sidelink.

In an optional embodiment of the present disclosure, the sidelink physical channel includes: at least one of a physical sidelink control channel (PSCCH), a physical sidelink feedback channel (PSFCH), or a physical sidelink broadcast channel (PSBCH); when the resources occupied by the S-PRS collide with the resource occupied by at least one physical channel of the PSCCH, the PSFCH and the PSBCH, the S-PRS is not transmitted on the collided resource.

In an optional embodiment of the present disclosure, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with the resource occupied by at least one of the SL DMRS, the SL CSI-RS and the SL PT-RS, the S-PRS is not transmitted on the collided resource.

In an optional embodiment of the present disclosure, the sidelink synchronization signal includes: at least one of S-PSS or S-SSS; when the resource occupied by the S-PRS collides with the resource occupied by at least one of the S-PSS or the S-SSS, the S-PRS is not transmitted on a resource that collide with the resources occupied by at least one of the S-PSS or the S-SSS among resources for transmitting the S-PRS.

A specific example is as follows: when at least one resource element occupied by the sidelink positioning reference signal S-PRS is located on the symbol occupied by the automatic gain control signal AGC, no signal is transmitted on the S-PRS resource element located in the symbol occupied by the automatic gain control signal AGC.

When at least one resource element occupied by the sidelink positioning reference signal S-PRS is located on the symbol occupied by the guard period GP, no signal is transmitted on the S-PRS resource element located on the symbol occupied by the guard period GP.

When at least one resource element occupied by the sidelink positioning reference signal S-PRS is located on a symbol occupied by at least one of the three physical channels, such as PSCCH, PSFCH, and PSBCH, no signal is transmitted on the S-PRS resource element located on the symbol occupied by the PSCCH, PSFCH, PSBCH, etc.

When at least one resource element occupied by the sidelink positioning reference signal S-PRS is located on a symbol occupied by at least one of the five signals, such as S-PSS, S-SSS, SL DMRS, SL CSI-RS, SL PT-RS, etc., no signal is transmitted on the S-PRS resource element located on the symbol occupied by the S-PSS, S-SSS, SL DMRS, SL CSI-RS, SL PT-RS.

As shown in FIG. 3, a transmission pattern of S-PRS on one resource block is Staggered interleaved transmission, that is, the positions of the transmission subcarriers on each symbol are different, which becomes a pattern of interleaved transmission. However, when the RE occupied by the S-PRS is located on the AGC symbol, PSCCH symbol or GP symbol, it will collide with the AGC signal, PSCCH channel or GP originally transmitted on these symbols. Since the transmission priority of the AGC signal, the PSCCH channel or GP is relatively high, so when a collision occurs, the S-PRS will not be transmitted, the AGC signal, PSCCH channel or GP will be transmitted preferentially. In this way, reliable transmission of the AGC signal, PSCCH channel or GP can be guaranteed. However, the S-PRS occupies more REs, and no transmission on S-PRS REs in a few positions will not cause a significant decrease in the performance of the S-PRS.

In this embodiment, when the sidelink positioning reference signal S-PRS and at least one type of information in the first information set occupy at least one resource element (RE) at the same time, no signal is transmitted on the resource element or the OFDM symbol or the resource block commonly occupied by the sidelink positioning reference signal S-PRS and the first information set. Therefore, the power adjustment effect of the AGC can be improved; the decoding success rate of the PSCCH/PSFCH can be improved; the protection effect of the GP can be improved.

In this embodiment, the staggering of the S-PRS resource set and the S-SSB resource means that during configuration, the time-frequency resources occupied by the S-PRS resource set and the time-frequency resources occupied by the S-SSB do not overlap, that is the resource locations occupied by both parties are mutually exclusive. Or, during configuration, the time-frequency resources occupied by the S-PRS resource set and the time-frequency resources occupied by the S-SSB may overlap. When the time-frequency resources occupied by the S-PRS resource set and the time-frequency resources occupied by the S-SSB partially overlap, the S-PRS is not transmitted on the part of the time-frequency resources where the S-PRS resource set and the S-SSB resource overlap, that is, the S-PRS is punctured.

In particular, the UE assumes that S-PRS will not be mapped on any symbol or slot containing S-SSB, and S-PRS and S-SSB are not transmitted in the same symbol or slot, that is: if one symbol or slot is used for transmission of the S-SSB, then this symbol or slot does not map S-PRS.

For neighboring TRPs or neighboring cells, after the time-frequency position of the S-SSB transmission of the neighboring TPRs or neighboring cells is determined, the terminal assumes that the slot used for transmitting S-SSB by the neighboring TPRs or neighboring cells will not map S-PRS.

In this embodiment, the S-PRS resource set and the S-SSB resource are staggered, which can avoid the interference of the S-PRS on the S-SSB detection, and improve the detection success rate of the S-SSB.

In an optional embodiment of the present disclosure, the resource occupied by the S-PRS colliding with the resource occupied by at least one type of information in the first information set includes:

The S-PRS and at least one type of information in the first information set occupying at least one same resource element; or, The S-PRS and at least one type of information in the first information set occupying at least one same OFDM symbol.

The same resource element refer to that the two occupied resource elements are located in the same OFDM symbol and the same subcarrier.

In an optional embodiment of the present disclosure, the resource includes: at least one of a resource element RE, an OFDM symbol, a slot, or a resource block RB.

Optionally, not transmitting the S-PRS on the collided resource, including at least one of the following:

not transmitting the S-PRS on the RE occupied by at least one type of information in the first information set;

not transmitting the S-PRS on the OFDM symbol or slot occupied by at least one type of information in the first information set;

not transmitting the S-PRS on the RB occupied by at least one type of information in the first information set.

In an optional embodiment of the present disclosure, not transmitting the S-PRS on the OFDM symbol or the slot occupied by at least one type of information in the first information set, includes:

For a neighboring TRP or a neighboring cell, after determining a first time-frequency location on which at least one type of information in the first information set of the neighboring TPR or neighboring cell is transmitted, not transmitting the S-PRS on the OFDM symbol or slot occupied by the first time-frequency location.

Figure 4:
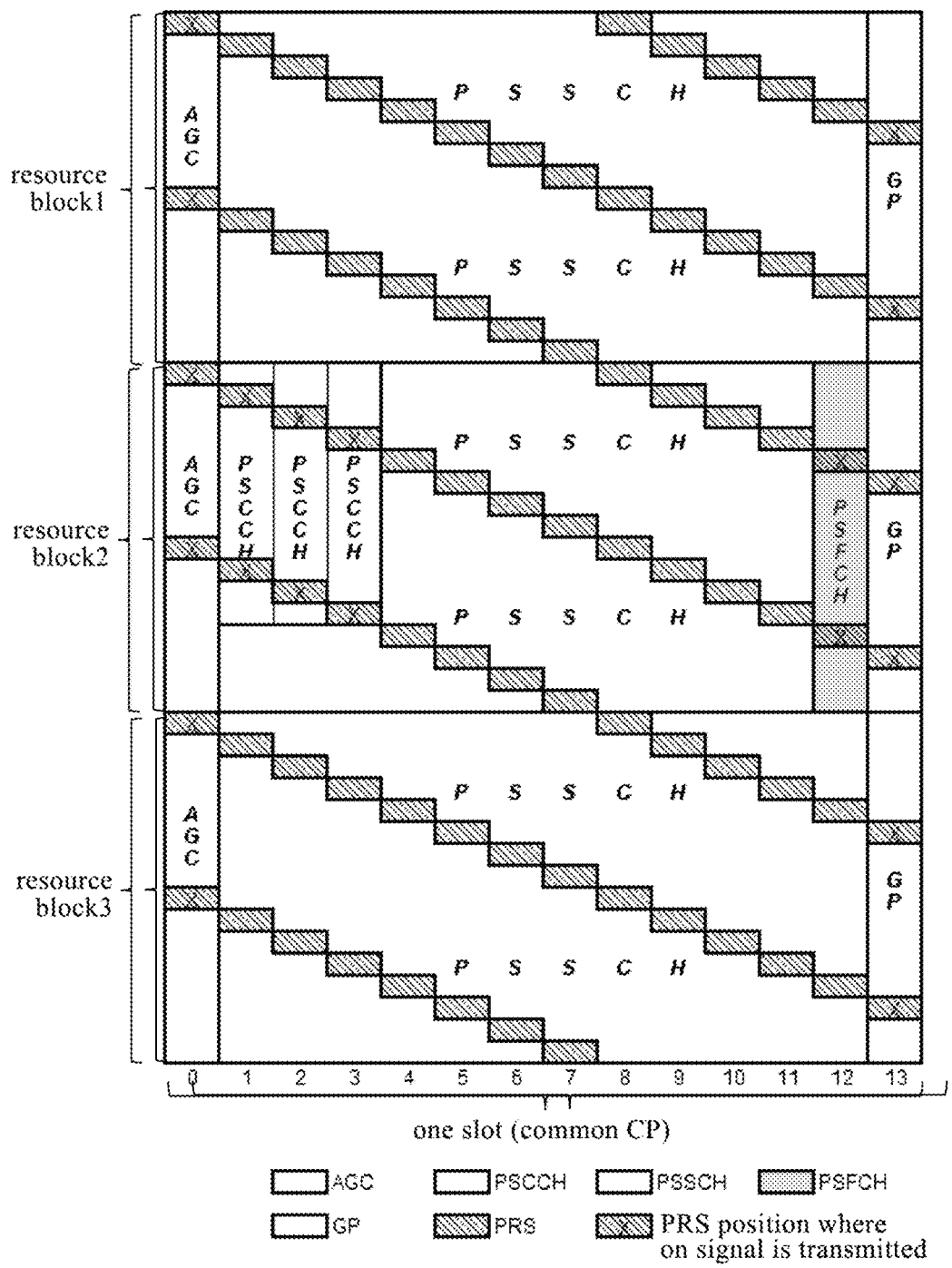
FIG. 4 is a schematic diagram of not transmitting S-PRS (puncturing) on a shared resource element (RE) according to an embodiment of the present disclosure.

In this embodiment, the not transmitting a signal on the resource element RE occupied by other channels or signals refers to: during the resource mapping between the S-PRS and at least one type of information in the first information set, when the S-PRS and the at least one type of information in the first information set occupies at least the same resource element (RE), not transmitting the S-PRS on the resource element RE configured with at least one type of information in the first information set;

As shown in FIG. 4, since S-PRS has shared REs with AGC, PSCCH, PSFCH, GP, etc. in resource block 2, S-PRS does not transmit signals on these shared REs in resource block 2, the S-PRS is normally transmitted on REs that are not shared by other S-PRS and AGC, PSCCH, PSFCH, and GP.

During the resource mapping between the S-PRS and a certain SL physical channel or signal, when the S-PRS and other channels or signals occupy at least the same resource element (RE), the S-PRS will not be transmitted on the resource element RE configured with a certain SL physical channel or signal. Therefore, the power adjustment effect of the AGC can be improved; the decoding success rate of the PSCCH/PSFCH can be improved; the protection effect of the GP can be improved. At the same time, it will not puncture too much S-PRS REs, and will not affect the positioning performance of S-PRS. The disadvantage is that the S-PRS REs transmitted in other locations may interfere with the transmission of PSCCH/PSFCH/PSSCH transmitted by other users.

Figure 5:
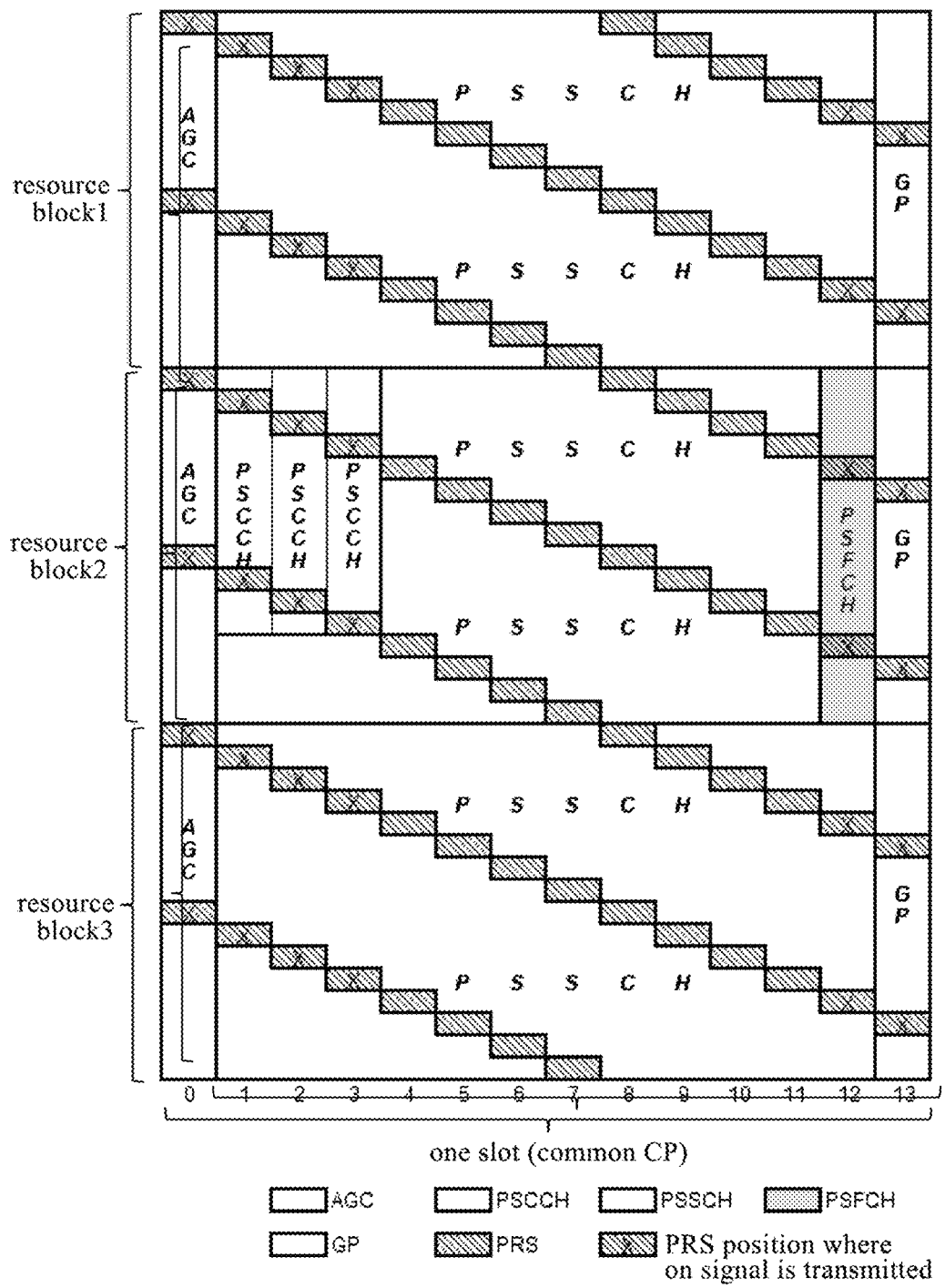
FIG. 5 is a schematic diagram of not transmitting S-PRS (puncturing) on a shared OFDM symbol according to an embodiment of the present disclosure.

In this embodiment, the not transmitting a signal on the resource element RE occupied by other channels or signals refers to: during the resource mapping between the S-PRS and at least one type of information in the first information set, when the S-PRS and the at least one type of information in the first information set are mapped on the same OFDM symbol, not transmitting the S-PRS on the symbol configured with at least one type of information in the first information set;

As shown in FIG. 5, since S-PRS shares REs with AGC, PSCCH, PSFCH, GP, etc., S-PRS does not transmit signals on the symbols occupied by these shared REs (i.e.: OFDM symbols #0, #1, #2, #3, #12 and #13), the S-PRS is transmitted normally on symbols occupied by other S-PRS and REs not shared by AGC, PSCCH, PSFCH, GP (i.e.: OFDM symbols #4, #5, #6, #7, #8, #9, #10 and #11).

In this embodiment, during the resource mapping between the S-PRS and a certain SL physical channel or signal, when the S-PRS and other channels or signals occupy at least the same resource element (RE), the S-PRS will not be transmitted on OFDM symbols configured with the some type of SL physical channel or signal. Therefore, the power adjustment effect of the AGC can be improved; the decoding success rate of the PSCCH/PSFCH can be improved; the protection effect of the GP can be improved. At the same time, since the S-PRS on the whole symbol will not be transmitted, the interference of the S-PRS RE to the transmission of PSCCH/PSFCH/PSSCH transmitted by other users can be reduced. The disadvantage is that since the S-PRS on the entire symbol does not transmit data, the positioning performance of the S-PRS will be degraded to a certain extent.

In this embodiment, the not transmitting a signal on the resource element RE occupied by other channels or signals refers to: during the resource mapping between the S-PRS and at least one type of information in the first information set, when the S-PRS and the at least one type of information in the first information set are mapped on the same resource block RB, the S-PRS will not be transmitted on the RB configured with at least one type of information in the first information set.

Figure 6:
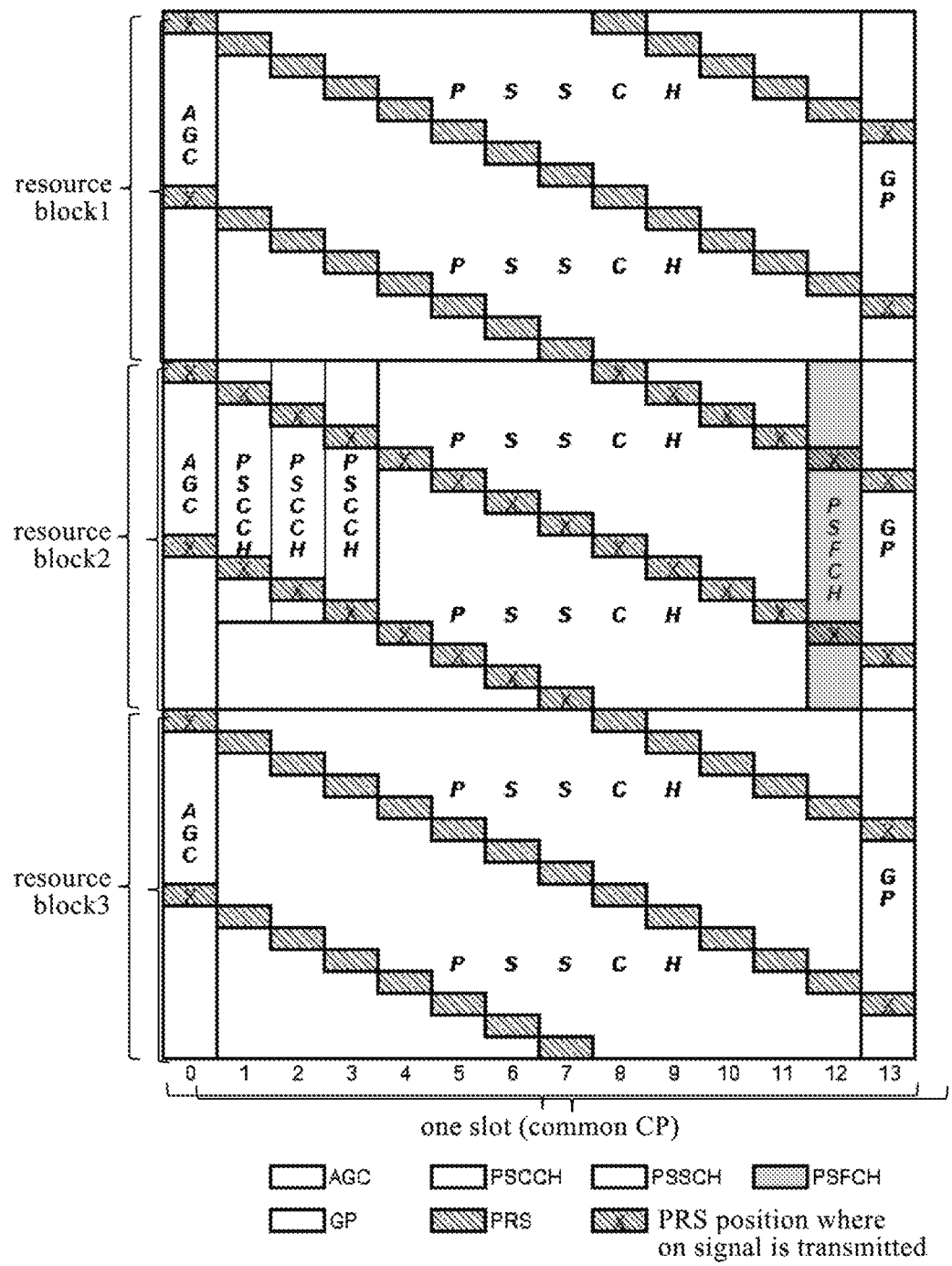
FIG. 6 is a schematic diagram of not transmitting S-PRS (puncturing) on a shared resource block (RB) according to an embodiment of the present disclosure.

As shown in FIG. 6, since S-PRS shares REs with PSCCH and PSFCH on resource block 2, S-PRS does not transmit signals on the resource blocks occupied by these shared REs (i.e.: resource block 2). S-PRS is normally transmitted on the resource blocks (i.e.: resource block 1 and resource block 2) occupied by other S-PRS and REs that are not shared by PSCCH and PSFCH.

In this embodiment, during the resource mapping between the S-PRS and a certain SL physical channel or signal, when the S-PRS and other channels or signals occupy at least the same resource element (RE), the S-PRS will not be transmitted on the RB configured with a certain SL physical channel or signal. Therefore, the power adjustment effect of the AGC can be improved; the decoding success rate of the PSCCH/PSFCH can be improved; the protection effect of the GP can be improved. At the same time, since the S-PRS on the entire RB will not be transmitted, the interference of the S-PRS RE to the transmission of PSCCH/PSFCH/PSSCH transmitted by other users can be reduced. The disadvantage is that since the S-PRS on the entire RB does not transmit data, the positioning performance of the S-PRS will be degraded to a certain extent.

In an optional embodiment of the present disclosure, not transmitting the S-PRS on the collided resource includes: determining whether to transmit the S-PRS on the collided resource in a pre-configured mode, or through a configuration signaling, and determining not to transmit the S-PRS on at least one of collided REs, symbols, slots, or RBs.

It is configurable not to transmit signals on the resource element RE occupied by at least one type of information in the first information set, that is, the terminal receives configuration signaling transmitted by another terminal or a base stations, and determines whether to transmit signals on the resource element RE commonly occupied by at least one type of information in the first information set; and determining not to transmit data with the following three schemes:

Not transmitting the S-PRS on the RE configured with at least one type of information in the first information set;

Not transmitting the S-PRS on the symbol configured with at least one type of information in the first set of information;

Not transmitting the S-PRS on the RB configured with at least one type of information in the first set of information.

In addition, different schemes of not transmitting signals may be selected according to different types of information in the first information set which commonly occupies the resource element RE with the S-PRS.

This embodiment adopts a configurable way to determine whether to not transmit signals on the shared resource element and the specific scheme of not transmitting signals, which improves the flexibility of the configuration of not transmitting signals, different schemes are adopted based on different channels, different signals, AGCs or GPs.

In an optional embodiment of the present disclosure, the method for transmitting a sidelink positioning reference signal may further include: Step 22: transmitting the S-PRS on remaining resources other than the collided resource among the resources occupied by the S-PRS.

Optionally, when transmitting the S-PRS on remaining resources other than the collided resource among the resources occupied by the S-PRS, the method further includes:

when the transmitted S-PRS is located in a first symbol, the S-PRS occupying at least part of frequency domain resources in the first symbol for transmission; or, S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or, an S-PRS pattern on the first symbol in one slot being exactly the same as a PRS pattern on a second symbol, the first symbol is used as automatic gain control AGC.

In this embodiment, the S-PRS is used for AGC, that is, the S-PRS occupies at least all or part of the frequency domain resources in the first symbol of the Sidelink for transmission. The S-PRSs transmitted by different users are multiplexed on the AGC symbols in a comb-like mapping manner, and the S-PRSs transmitted by different users occupy different comb teeth, and the comb teeth refer to the staggered frequency domain subcarriers. The PRS pattern on the first symbol on one slot is exactly the same as the PRS pattern on the second symbol, the first symbol is used for AGC.

In this embodiment, the S-PRS is used as the AGC, which can not only complete the AGC function, but also obtain an extra PRS signal of the one symbol, thereby improving the positioning accuracy.

In the above embodiments of the present disclosure, when the sidelink positioning reference signal S-PRS and at least one type of information in the first information set occupy at least one resource element (RE) at the same time, no signal is transmitted on the resource elements or OFDM symbols or resource blocks commonly occupied by the sidelink positioning reference signal S-PRS and the first information set. By using this method, the terminal can transmit the positioning reference signal S-PRS to complete the positioning function, while reducing the mutual interference between the S-PRS and other information such as the sidelink physical channel, the sidelink reference signal, the sidelink synchronization signal, AGC or GP, and improving the positioning accuracy and spectral efficiency of the sidelink.

As shown in FIG. 7, an embodiment of the present disclosure further provides a method for receiving a sidelink positioning reference signal, which is applied to a terminal, and the method includes:

Step 71: When a resource occupied by the sidelink positioning reference signal (S-PRS) collides with a resource occupied by at least one type of information in a first information set, not receiving the S-PRS on the collided resource, wherein the first information set includes: at least one of a sidelink physical channel, a sidelink reference signal, a sidelink synchronization signal, a sidelink synchronization signal block (S-SSB), an automatic gain control information (AGC) and a guard period information (GP).

Optionally, the resource occupied by the S-PRS colliding with the resource occupied by at least one type of information in the first information set includes:

The S-PRS and at least one type of information in the first information set occupying at least one same resource element; or, The S-PRS and at least one type of information in the first information set occupying at least one same OFDM symbol.

The same resource element refer to that the two occupied resource elements are located in the same OFDM symbol and the same subcarrier.

Optionally, the resource includes: at least one of a resource element RE, an OFDM symbol, a slot, or a resource block RB.

Optionally, not receiving the S-PRS on the collided resource, including at least one of the following:
  not transmitting the S-PRS on the RE occupied by at least one type of information in the first information set;
  not transmitting the S-PRS on the OFDM symbol or slot occupied by at least one type of information in the first information set;
  not transmitting the S-PRS on the RB occupied by at least one type of information in the first information set.

Optionally, not receiving the S-PRS on the collided resource includes: determining whether to receive the S-PRS on the collided resource in a pre-configured mode, or through a configuration signaling, and determining not to receive the S-PRS on at least one of collided REs, symbols, slots, or RBs.

Optionally, not receiving the S-PRS on the symbol or the slot occupied by at least one type of information in the first information set, incudes:

For a neighboring TRP or a neighboring cell, after determining a first time-frequency location on which at least one type of information in the first information set of the neighboring TPR or neighboring cell is transmitted, not transmitting the S-PRS on the symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resources occupied by the S-PRS collide with the resource occupied by at least one physical channel of the PSCCH, the PSFCH and the PSBCH, the S-PRS is not received on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with the resource occupied by at least one of the SL DMRS, the SL CSI-RS and the SL PT-RS, the S-PRS is not received on the collided resource.

Optionally, the sidelink synchronization signal includes: at least one of S-PSS or S-SSS; when the resource occupied by the S-PRS collides with the resource occupied by at least one of the S-PSS or the S-SSS, the S-PRS is not received on a resource that collide with the resources occupied by at least one of the S-PSS or the S-SSS among resources for transmitting the S-PRS.

Optionally, the method for receiving the sidelink positioning reference signal further includes: receiving the S-PRS on remaining resources other than the collided resource among the resources occupied by the S-PRS.

Optionally, when receiving the S-PRS on remaining resources other than the collided resource among the resources occupied by the S-PRS, the method further includes:
  when the received S-PRS is located in a first symbol, the S-PRS occupying at least part of frequency domain resources in the first symbol for transmission; or,
  S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or,
  an S-PRS pattern on the first symbol in one slot being exactly the same as a PRS pattern on a second symbol, the first symbol is used as automatic gain control AGC.

It should be noted that this method embodiment corresponds to the embodiment of the receiving-side terminal shown in FIG. 2. All implementations in the embodiment shown in FIG. 2 are applicable to the method embodiment, and can also achieve the same technical effect.

As shown in FIG. 8, an embodiment of the present disclosure further provides a terminal 80, including: a transceiver 81, a processor 82, and a memory 83, wherein the memory 83 stores a program executable by the processor 82 to implement the step of: when a resource occupied by the sidelink positioning reference signal (S-PRS) collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), an automatic gain control information (AGC) and a guard period information (GP).

Optionally, the resource occupied by the S-PRS colliding with the resource occupied by at least one type of information in the first information set includes:

The S-PRS and at least one type of information in the first information set occupying at least one same resource element; or, The S-PRS and at least one type of information in the first information set occupying at least one same OFDM symbol.

Optionally, the same resource element refer to that the two occupied resource elements are located in the same OFDM symbol and the same subcarrier.

Optionally, the resource includes: at least one of a resource element RE, an OFDM symbol, a slot, or a resource block RB.

Optionally, not transmitting the S-PRS on the collided resource, including at least one of the following:
  not transmitting the S-PRS on the RE occupied by at least one type of information in the first information set;
  not transmitting the S-PRS on the OFDM symbol or slot occupied by at least one type of information in the first information set;
  not transmitting the S-PRS on the RB occupied by at least one type of information in the first information set.

Optionally, not transmitting the S-PRS on the collided resource includes: determining whether to transmit the S-PRS on the collided resource in a pre-configured mode, or through a configuration signaling, and determining not to transmit the S-PRS on at least one of collided REs, symbols, slots, or RBs.

Optionally, not transmitting the S-PRS on the symbol or the slot occupied by at least one type of information in the first information set, incudes:

For a neighboring TRP or a neighboring cell, after determining a first time-frequency location on which at least one type of information in the first information set of the neighboring TPR or neighboring cell is transmitted, not transmitting the S-PRS on the symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resources occupied by the S-PRS collide with the resource occupied by at least one physical channel of the PSCCH, the PSFCH and the PSBCH, the S-PRS is not transmitted on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with the resource occupied by at least one of the SL DMRS, the SL CSI-RS and the SL PT-RS, the S-PRS is not transmitted on the collided resource.

Optionally, the sidelink synchronization signal includes: at least one of S-PSS or S-SSS; when the resource occupied by the S-PRS collides with the resource occupied by at least one of the S-PSS or the S-SSS, the S-PRS is not transmitted on a resource that collide with the resources occupied by at least one of the S-PSS or the S-SSS among resources for transmitting the S-PRS.

Optionally, the method for transmitting the sidelink positioning reference signal further includes: transmitting the S-PRS on remaining resources other than the collided resource among the resources occupied by the S-PRS.

Optionally, when transmitting the S-PRS on remaining resources other than the collided resource among the resources occupied by the S-PRS, the method further includes:
when the transmitted S-PRS is located in a first symbol, the S-PRS occupying at least part of frequency domain resources in the first symbol for transmission; or,
S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or,
an S-PRS pattern on the first symbol in one slot being exactly the same as a PRS pattern on a second symbol, the first symbol is used as automatic gain control AGC.

It should be noted that the terminal in this embodiment corresponds to the embodiment shown in FIG. 2. All implementations in the embodiment shown in FIG. 2 are applicable to the embodiment, and can also achieve the same technical effect. In the terminal, the transceiver 81 can be communicated and connected with the memory 83 and the processor 82 through a bus interface, the function of the processor 82 can also be realized by the transceiver 81, and the function of the transceiver 81 can also be realized by the processor 82. It should be noted that the above-mentioned terminal provided by the embodiments of the present disclosure can implement all the method steps implemented by the above-mentioned method embodiments, and can achieve the same technical effect, which will be described in detail.

Figure 9:
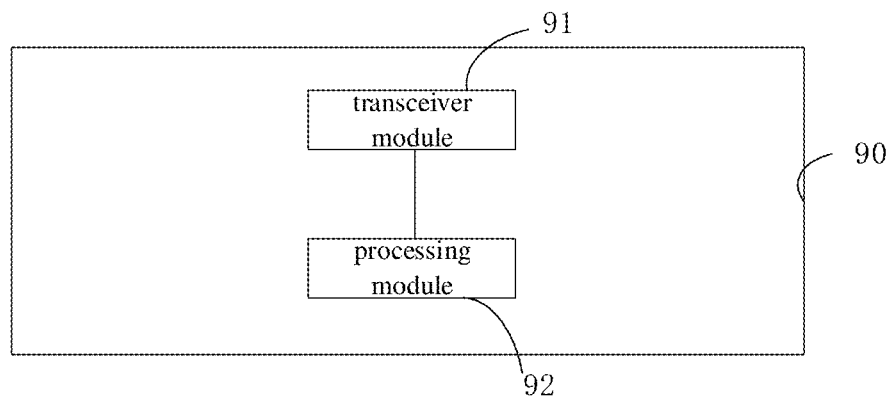
FIG. 9 is a block diagram of modules of a device for transmitting a sidelink positioning reference signal of a terminal on the transmitting side according to an embodiment of the present disclosure.

As shown in FIG. 9, an embodiment of the present disclosure further provides a device 90 for transmitting a sidelink positioning reference signal, including:

a transceiver module 91, configured to, when a resource occupied by the sidelink positioning reference signal (S-PRS) collides with a resource occupied by at least one type of information in a first information set, not transmit the S-PRS on the collided resource, wherein the first information set includes: at least one of a sidelink physical channel, a sidelink reference signal, a sidelink synchronization signal, a sidelink synchronization signal block (S-SSB), an automatic gain control information (AGC) and a guard period information (GP).

Optionally, the resource occupied by the S-PRS colliding with the resource occupied by at least one type of information in the first information set includes:

The S-PRS and at least one type of information in the first information set occupying at least one same resource element; or, The S-PRS and at least one type of information in the first information set occupying at least one same OFDM symbol.

Optionally, the same resource element refer to that the two occupied resource elements are located in the same OFDM symbol and the same subcarrier.

Optionally, the resource includes: at least one of a resource element RE, an OFDM symbol, a slot, or a resource block RB.

Optionally, not transmitting the S-PRS on the collided resource, including at least one of the following:
not transmitting the S-PRS on the RE occupied by at least one type of information in the first information set;
not transmitting the S-PRS on the OFDM symbol or slot occupied by at least one type of information in the first information set;
not transmitting the S-PRS on the RB occupied by at least one type of information in the first information set.

Optionally, not transmitting the S-PRS on the collided resource includes: determining whether to transmit the S-PRS on the collided resource in a pre-configured mode, or through a configuration signaling, and determining not to transmit the S-PRS on at least one of collided REs, symbols, slots, or RBs.

Optionally, not transmitting the S-PRS on the symbol or the slot occupied by at least one type of information in the first information set, incudes:

For a neighboring TRP or a neighboring cell, after determining a first time-frequency location on which at least one type of information in the first information set of the neighboring TPR or neighboring cell is transmitted, not transmitting the S-PRS on the symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resources occupied by the S-PRS collide with the resource occupied by at least one physical channel of the PSCCH, the PSFCH and the PSBCH, the S-PRS is not transmitted on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with the resource occupied by at least one of the SL DMRS, the SL CSI-RS and the SL PT-RS, the S-PRS is not transmitted on the collided resource.

Optionally, the sidelink synchronization signal includes: at least one of S-PSS or S-SSS; when the resource occupied by the S-PRS collides with the resource occupied by at least one of the S-PSS or the S-SSS, the S-PRS is not transmitted on a resource that collide with the resources occupied by at least one of the S-PSS or the S-SSS among resources for transmitting the S-PRS.

Optionally, the method for transmitting the sidelink positioning reference signal further includes: transmitting the S-PRS on remaining resources other than the collided resource among the resources occupied by the S-PRS.

Optionally, when transmitting the S-PRS on remaining resources other than the collided resource among the resources occupied by the S-PRS, the method further includes:
  when the transmitted S-PRS is located in a first symbol, the S-PRS occupying at least part of frequency domain resources in the first symbol for transmission; or,
  S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or,
  an S-PRS pattern on the first symbol in one slot being exactly the same as a PRS pattern on a second symbol, the first symbol is used as automatic gain control AGC.

It should be noted that the device in this embodiment corresponds to the embodiment shown in FIG. 2. All implementations in the embodiment shown in FIG. 2 are applicable to the embodiment, and can also achieve the same technical effect. The device may further include a processing module 92, and the processing module 92 is configured to process the information transmitted by the transceiver module 91, and the like. It should be noted that the above-mentioned device provided by the embodiments of the present disclosure can implement all the method steps implemented by the above-mentioned method embodiments, and can achieve the same technical effect, which will be described in detail.

Figure 10:
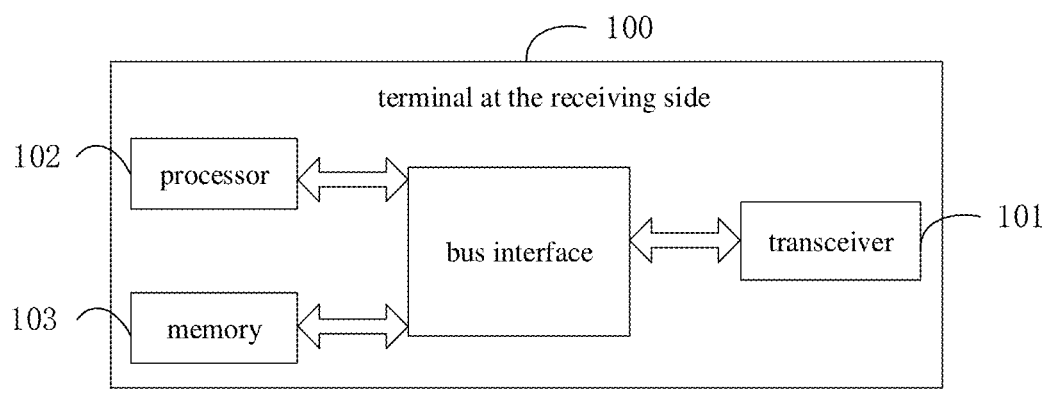
FIG. 10 is a schematic structural diagram of a terminal on the receiving side according to an embodiment of the present disclosure.

As shown in FIG. 10, an embodiment of the present disclosure further provides a terminal 100, including: a transceiver 101, a processor 102, and a memory 103, wherein the memory 103 stores a program executable by the processor 102 to implement the step of: when a resource occupied by the sidelink positioning reference signal (S-PRS) collides with a resource occupied by at least one type of information in a first information set, not receiving the S-PRS on the collided resource, wherein the first information set includes: at least one of a sidelink physical channel, a sidelink reference signal, a sidelink synchronization signal, a sidelink synchronization signal block (S-SSB), an automatic gain control information (AGC) and a guard period information (GP).

Optionally, the resource occupied by the S-PRS colliding with the resource occupied by at least one type of information in the first information set includes:
  The S-PRS and at least one type of information in the first information set occupying at least one same resource element; or,
  The S-PRS and at least one type of information in the first information set occupying at least one same OFDM symbol.

The same resource element refer to that the two occupied resource elements are located in the same OFDM symbol and the same subcarrier.

Optionally, the resource includes: at least one of a resource element RE, an OFDM symbol, a slot, or a resource block RB.

Optionally, not receiving the S-PRS on the collided resource, including at least one of the following:
  not transmitting the S-PRS on the RE occupied by at least one type of information in the first information set;
  not transmitting the S-PRS on the OFDM symbol or slot occupied by at least one type of information in the first information set;
  not transmitting the S-PRS on the RB occupied by at least one type of information in the first information set.

Optionally, not receiving the S-PRS on the collided resource includes: determining whether to receive the S-PRS on the collided resource in a pre-configured mode, or through a configuration signaling, and determining not to receive the S-PRS on at least one of collided REs, symbols, slots, or RBs.

Optionally, not transmitting the S-PRS on the symbol or the slot occupied by at least one type of information in the first information set, incudes:
  For a neighboring TRP or a neighboring cell, after determining a first time-frequency location on which at least one type of information in the first information set of the neighboring TPR or neighboring cell is transmitted, not transmitting the S-PRS on the symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resources occupied by the S-PRS collide with the resource occupied by at least one physical channel of the PSCCH, the PSFCH and the PSBCH, the S-PRS is not received on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with the resource occupied by at least one of the SL DMRS, the SL CSI-RS and the SL PT-RS, the S-PRS is not received on the collided resource.

Optionally, the sidelink synchronization signal includes: at least one of S-PSS or S-SSS; when the resource occupied by the S-PRS collides with the resource occupied by at least one of the S-PSS or the S-SSS, the S-PRS is not received on a resource that collide with the resources occupied by at least one of the S-PSS or the S-SSS among resources for transmitting the S-PRS.

Optionally, the method for receiving the sidelink positioning reference signal further includes: receiving the S-PRS on remaining resources other than the collided resource among the resources occupied by the S-PRS.

Optionally, when receiving the S-PRS on remaining resources other than the collided resource among the resources occupied by the S-PRS, the method further includes:
  when the received S-PRS is located in a first symbol, the S-PRS occupying at least part of frequency domain resources in the first symbol for transmission; or,
  S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or,
  an S-PRS pattern on the first symbol in one slot being exactly the same as a PRS pattern on a second symbol, the first symbol is used as automatic gain control AGC.

It should be noted that the terminal in this embodiment corresponds to the embodiment shown in FIG. 7. All implementations in the embodiment shown in FIG. 7 are applicable to the embodiment, and can also achieve the same technical effect. In the terminal, the transceiver 101 can be communicated and connected with the memory 103 and the processor 102 through a bus interface, the function of the processor 102 can also be realized by the transceiver 101, and the function of the transceiver 101 can also be realized by the processor 102. It should be noted that the above-mentioned terminal provided by the embodiments of the present disclosure can implement all the method steps implemented by the above-mentioned method embodiments, and can achieve the same technical effect, which will be described in detail.

Figure 11:
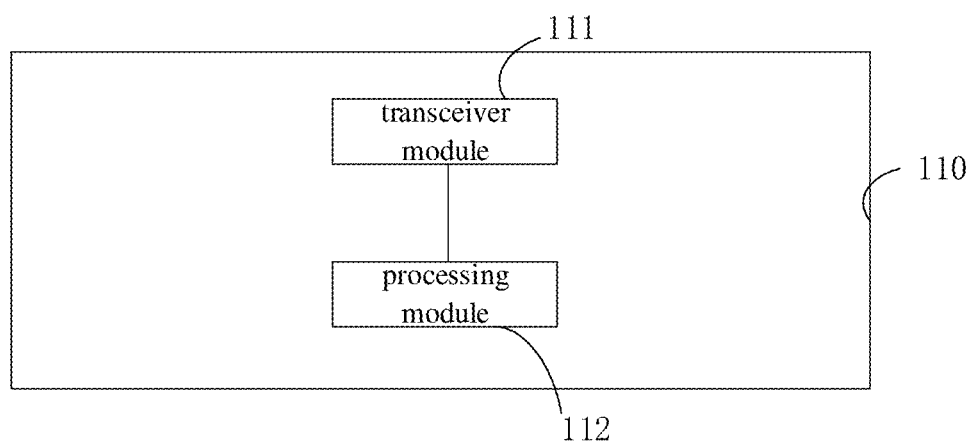
FIG. 11 is a block diagram of modules of a device for receiving a sidelink positioning reference signal of a terminal on the receiving side according to an embodiment of the present disclosure.

As shown in FIG. 11, an embodiment of the present disclosure further provides a signal receiving device 110, including:

a transceiver module 111, configured to, when a resource occupied by the sidelink positioning reference signal (S-PRS) collides with a resource occupied by at least one type of information in a first information set, not receive the S-PRS on the collided resource, wherein the first information set includes: at least one of a sidelink physical channel, a sidelink reference signal, a sidelink synchronization signal, a sidelink synchronization signal block (S-SSB), an automatic gain control information (AGC) and a guard period information (GP).

Optionally, the resource occupied by the S-PRS colliding with the resource occupied by at least one type of information in the first information set includes:

The S-PRS and at least one type of information in the first information set occupying at least one same resource element; or, The S-PRS and at least one type of information in the first information set occupying at least one same OFDM symbol.

The same resource element refer to that the two occupied resource elements are located in the same OFDM symbol and the same subcarrier.

Optionally, the resource includes: at least one of a resource element RE, an OFDM symbol, a slot, or a resource block RB.

Optionally, not receiving the S-PRS on the collided resource, including at least one of the following:

not transmitting the S-PRS on the RE occupied by at least one type of information in the first information set;

not transmitting the S-PRS on the OFDM symbol or slot occupied by at least one type of information in the first information set;

not transmitting the S-PRS on the RB occupied by at least one type of information in the first information set.

Optionally, not receiving the S-PRS on the collided resource includes: determining whether to receive the S-PRS on the collided resource in a pre-configured mode, or through a configuration signaling, and determining not to receive the S-PRS on at least one of collided REs, symbols, slots, or RBs.

Optionally, not receiving the S-PRS on the symbol or the slot occupied by at least one type of information in the first information set, incudes:

For a neighboring TRP or a neighboring cell, after determining a first time-frequency location on which at least one type of information in the first information set of the neighboring TPR or neighboring cell is transmitted, not transmitting the S-PRS on the symbol or slot occupied by the first time-frequency location.

Optionally, the sidelink physical channel includes: at least one of a physical sidelink control channel (PSCCH), a physical sidelink feedback channel (PSFCH), or a physical sidelink broadcast channel (PSBCH); when the resources occupied by the S-PRS collide with the resource occupied by at least one physical channel of the PSCCH, the PSFCH and the PSBCH, the S-PRS is not received on the collided resource.

Optionally, the sidelink reference signal includes: at least one of a sidelink modulation and demodulation reference signal (SL DMRS), a sidelink channel state information reference signal (SL CSI-RS), or a sidelink phase tracking reference signal (SL PT-RS); when the resource occupied by the S-PRS collides with the resource occupied by at least one of the SL DMRS, the SL CSI-RS and the SL PT-RS, the S-PRS is not received on the collided resource.

Optionally, the sidelink synchronization signal includes: at least one of S-PSS or S-SSS; when the resource occupied by the S-PRS collides with the resource occupied by at least one of the S-PSS or the S-SSS, the S-PRS is not received on a resource that collide with the resources occupied by at least one of the S-PSS or the S-SSS among resources for transmitting the S-PRS.

Optionally, the method for receiving the sidelink positioning reference signal further includes: receiving the S-PRS on remaining resources other than the collided resource among the resources occupied by the S-PRS.

Optionally, when receiving the S-PRS on remaining resources other than the collided resource among the resources occupied by the S-PRS, the method further includes:

when the received S-PRS is located in a first symbol, the S-PRS occupying at least part of frequency domain resources in the first symbol for transmission; or, S-PRSs transmitted by different terminals being multiplexed on AGC symbols in a comb-like mapping manner, and the S-PRSs transmitted by different terminals occupying different comb teeth, and the comb teeth referring to staggered frequency domain subcarriers; or, an S-PRS pattern on the first symbol in one slot being exactly the same as a PRS pattern on a second symbol, the first symbol is used as automatic gain control AGC.

It should be noted that the device in this embodiment corresponds to the embodiment shown in FIG. 7. All implementations in the embodiment shown in FIG. 7 are applicable to the embodiment, and can also achieve the same technical effect. The device may further include a processing module 112, and the processing module 112 is configured to process the information transmitted by the transceiver module 111, and the like. It should be noted that the above-mentioned device provided by the embodiments of the present disclosure can implement all the method steps implemented by the above-mentioned method embodiments, and can achieve the same technical effect, which will be described in detail.

Embodiments of the present disclosure further provide a processor-readable storage medium, where the processor-readable storage medium stores processor-executable instructions, and the processor-executable instructions are used to enable the processor to execute the methods as shown in FIG. 2 and FIG. 7, and the same technical effect can also be achieved.

In the above embodiments of the present disclosure, when the sidelink positioning reference signal S-PRS and at least one type of information in the first information set occupy at least one resource element (RE) at the same time, no signal is transmitted on the resource element or OFDM symbol commonly occupied by the sidelink positioning reference signal S-PRS and the first information set. By adopting this method, the terminal can transmit the positioning reference signal S-PRS to complete the positioning function, while reducing the mutual interference between the S-PRS and other sidelink physical channels, the sidelink reference signal, the sidelink synchronization signal, AGC or GP, and improving the positioning accuracy and spectral efficiency of the sidelink.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Those of ordinary skill in the art may implement the described functionality using different methods for each particular application, but such implementations should not be considered beyond the scope of the present disclosure.

Those skilled in the art can clearly understand that, for the convenience and brevity of description, the specific working process of the above-described systems, devices and units may refer to the corresponding processes in the method embodiments, which will not be repeated here.

In the embodiments provided in this application, it should be understood that the disclosed device and method may be implemented in other manners. For example, the device embodiments described above are only illustrative. For example, the division of the units is only a logical function division. In actual implementation, there may be other division methods. For example, multiple units or components may be combined or integrated into another system, or some features can be ignored, or not implemented. On the other hand, the coupling or direct coupling or communication connection may be through some interfaces, indirect coupling or communication connection of devices or units may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit.

The functions, if implemented in the form of software functional units and sold or used as independent products, may be stored in a computer-readable storage medium. Based on this understanding, the technical solutions of the present disclosure may be embodied in the form of software products in essence, or the parts that make contributions to related art. The computer software products are stored in a storage medium and include several instructions for a computer device (which may be a personal computer, a server, or a network device, etc.) to execute all or part of the steps of the methods described in the various embodiments of the present disclosure. The storage medium includes: a U disk, a removable hard disk, a ROM, a RAM, a magnetic disk, or an optical disk and other mediums that can store program codes.

Those of ordinary skill in the art can understand that all or part of the processes in the methods of the above embodiments can be accomplished by controlling the relevant hardware through a computer program, and the program can be stored in a computer-readable storage medium, and when the program is executed, it may include the processes of the embodiments of the above-mentioned methods. The storage medium may be a magnetic disk, an optical disk, a read-only memory (ROM), or a random access memory (RAM) or the like.

It can be understood that the embodiments described in the embodiments of the present disclosure may be implemented by hardware, software, firmware, middleware, microcode, or a combination thereof. For hardware implementation, modules, units and sub-units can be implemented in one or more Application Specific Integrated Circuits (ASIC), Digital Signal Processor (DSP), Digital Signal Processing Device (DSPD), Programmable Logic Device (PLD), Field-Programmable Gate Array (FPGA), general-purpose processor, controller, microcontroller, microprocessor, in other electronic units or combinations thereof.

For software implementation, the techniques described in the embodiments of the present disclosure may be implemented through modules (e.g., procedures, functions, etc.) that perform the functions described in the embodiments of the present disclosure. Software codes may be stored in memory and executed by a processor. The memory can be implemented inside the processor or external to the processor.

In addition, it should be pointed out that, in the device and method of the present disclosure, obviously, each component or each step can be decomposed and/or recombined. These decomposing and/or recombining should be considered equivalents of the present disclosure. Also, the steps of performing the above-mentioned series of processes can naturally be performed in described order, but need not necessarily be performed in chronological order, and some steps can be performed in parallel or independently of each other. Those of ordinary skill in the art can understand that all or any steps or components of the method and device of the present disclosure can be implemented in any computing device (including a processor, storage medium, etc.) or a network of computing devices in hardware, firmware, etc., software, or a combination thereof, which can be implemented by those of ordinary skill in the art using their basic programming skills after reading the description of the present disclosure.

Accordingly, the object of the present disclosure can also be achieved by running a program or set of programs on any computing device. The computing device may be a known general purpose device. Therefore, the object of the present disclosure can also be achieved merely by providing a program product containing program code for implementing the method or device. That is, such a program product also constitutes the present disclosure, and a storage medium in which such a program product is stored also constitutes the present disclosure. Obviously, the storage medium can be any known storage medium or any storage medium developed in the future. It should also be pointed out that, in the device and method of the present disclosure, obviously, each component or each step can be decomposed and/or recombined. These decomposing and/or recombining should be considered equivalents of the present disclosure. Also, the steps of executing the above-described series of processes can naturally be executed in the described order, but need not necessarily be executed in chronological order. Certain steps may be performed in parallel or independently of each other.

The above are optional embodiments of the present disclosure, and it should be pointed out that for those skilled in the art, several improvements and modifications can be made without departing from the principles described in the present disclosure, and these improvements and modifications are also within the scope of this disclosure.

What is claimed is:

1. A method for transmitting a sidelink positioning reference signal, applied to a terminal, comprising:
when a resource occupied by the sidelink positioning reference signal (S-PRS) collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information;
wherein the resource includes: at least one of a resource element (RE), an OFDM symbol, a slot, or a resource block (RB);
wherein not transmitting the S-PRS on the collided resource includes not transmitting the S-PRS on the OFDM symbol.

2. The method according to claim 1, wherein the resource occupied by the S-PRS colliding with the resource occupied by at least one type of information in the first information set includes:
the S-PRS and the at least one type of information in the first information set occupying at least one same resource element; or,
the S-PRS and the at least one type of information in the first information set occupying at least one same Orthogonal Frequency Division Multiplexing (OFDM) symbol.

3. The method according to claim 2, wherein the same resource element refers to that two occupied resource elements are located in the same OFDM symbol and a same subcarrier.

4. The method according to claim 1, wherein not transmitting the S-PRS on the collided resource further includes at least one of the following:
not transmitting the S-PRS on the RE occupied by the at least one type of information in the first information set;
not transmitting the S-PRS on the slot occupied by the at least one type of information in the first information set;
not transmitting the S-PRS on the RB occupied by the at least one type of information in the first information set.

5. The method according to claim 1, wherein not transmitting the S-PRS on the collided resource includes:
determining whether to transmit the S-PRS on the collided resource in a pre-configured mode or through a configuration signaling, and determining not to transmit the S-PRS on at least one of collided REs, symbols, slots, or RBs.

6. The method according to claim 4, wherein not transmitting the S-PRS on the symbol or the slot occupied by at least one type of information in the first information set, incudes:
for a neighboring transmission reception point (TRP) or a neighboring cell, after determining a first time-frequency location on which the at least one type of information in the first information set of the neighboring TPR or neighboring cell is transmitted, not transmitting the S-PRS on a symbol or slot occupied by the first time-frequency location.

7. The method according to claim 1, wherein the sidelink physical channel includes: at least one of a physical sidelink control channel (PSCCH), a physical sidelink feedback channel (PSFCH), or a physical sidelink broadcast channel (PSBCH);
when the resource occupied by the S-PRS collides with a resource occupied by at least one physical channel of the PSCCH, the PSFCH and the PSBCH, the S-PRS is not transmitted on the collided resource.

8. The method according to claim 1, wherein the sidelink reference signal includes: at least one of a sidelink modulation and demodulation reference signal (SL DMRS), a sidelink channel state information reference signal (SL CSI-RS), or a sidelink phase tracking reference signal (SL PT-RS);
when the resource occupied by the S-PRS collides with a resource occupied by at least one of the SL DMRS, the SL CSI-RS and the SL PT-RS, the S-PRS is not transmitted on the collided resource.

9. A terminal, comprising: a transceiver, a processor, and a memory, wherein the memory stores a program executable by the processor to implement the step of: when a resource occupied by the sidelink positioning reference signal (S-PRS) collides with a resource occupied by at least one type of information in a first information set, not transmitting the S-PRS on the collided resource, wherein the first information set includes: at least one of a sidelink physical channel, a sidelink reference signal, a sidelink synchronization signal, a sidelink synchronization signal block (S-SSB), automatic gain control (AGC) information or guard period (GP) information;
wherein the resource includes: at least one of a resource element (RE), an OFDM symbol, a slot, or a resource block (RB);
wherein not transmitting the S-PRS on the collided resource includes not transmitting the S-PRS on the OFDM symbol.

10. The terminal according to claim 9, wherein the resource occupied by the S-PRS colliding with the resource occupied by at least one type of information in the first information set includes:
the S-PRS and the at least one type of information in the first information set occupying at least one same resource element; or,
the S-PRS and the at least one type of information in the first information set occupying at least one same Orthogonal Frequency Division Multiplexing (OFDM) symbol.

11. The terminal according to claim 9, wherein not transmitting the S-PRS on the collided resource further includes at least one of the following:
not transmitting the S-PRS on the RE occupied by the at least one type of information in the first information set;
not transmitting the S-PRS on the slot occupied by the at least one type of information in the first information set;
not transmitting the S-PRS on the RB occupied by the at least one type of information in the first information set.

12. The terminal according to claim 9, wherein not transmitting the S-PRS on the collided resource includes:
determining whether to transmit the S-PRS on the collided resource in a pre-configured mode or through a configuration signaling, and determining not to transmit the S-PRS on at least one of collided REs, symbols, slots, or RBs.

* * * * *